US010585933B2

(12) United States Patent
Bianchi et al.

(10) Patent No.: US 10,585,933 B2
(45) Date of Patent: Mar. 10, 2020

(54) SYSTEM AND METHOD FOR CLASSIFICATION OF LOW RELEVANCE RECORDS IN A DATABASE USING INSTANCE-BASED CLASSIFIERS AND MACHINE LEARNING

(71) Applicant: INTERNATIONAL BUSINESS MACHINES CORPORATION, Armonk, NY (US)

(72) Inventors: Thiago Bianchi, São Carlos (BR); Pablo Roberto Millicay Gonzalez, São Paulo (BR); Giuliano Diniz de Morais, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 15/678,657

(22) Filed: Aug. 16, 2017

(65) Prior Publication Data

US 2019/0057149 A1    Feb. 21, 2019

(51) Int. Cl.
*G06F 17/00* (2019.01)
*G06F 16/35* (2019.01)
(Continued)

(52) U.S. Cl.
CPC ........ *G06F 16/358* (2019.01); *G06F 16/2379* (2019.01); *G06F 16/24557* (2019.01); *G06F 16/285* (2019.01)

(58) Field of Classification Search
CPC ............ G06F 16/358; G06F 16/22379; G06F 16/24557; G06F 16/285; G06F 16/2379
(Continued)

(56) References Cited

U.S. PATENT DOCUMENTS 8,296,309 B2   10/2012   Brassil et al.
8,819,208 B2    8/2014   Wright
(Continued)

FOREIGN PATENT DOCUMENTS

CN        106055613      10/2016
WO    2015181511 A1    12/2015

OTHER PUBLICATIONS

Anonymous, "Machine learning", https://en.wikipedia.org/wiki/Machine_learning, Wikipedia, Aug. 15, 2017, 14 pages.
(Continued)

*Primary Examiner* — Isaac M Woo
(74) *Attorney, Agent, or Firm* — William H. Hartwell; Andrew D. Wright; Roberts Mlotkowski Safran Cole & Calderon, P.C.

(57) ABSTRACT

Devices and methods for classification of low relevance records in a database are disclosed. A method includes: in response to a request to delete a selected database record, generating a vector representation of the selected record, deleting the selected record in the database, and storing the vector representation of the deleted selected record; in response to the storing the vector representation of the deleted selected record, determining a cluster from which the vector representation has a shortest determined distance, among a plurality of clusters into which a plurality of vector representations of deleted records is partitioned; determining a distance between a record in the database and a nearest cluster among the plurality of clusters into which the plurality of vector representations of deleted records is partitioned; and in response to the record being within a predetermined distance of the nearest cluster, determining that the record is a deletion candidate record.

14 Claims, 6 Drawing Sheets

(51) Int. Cl.
*G06F 16/23* (2019.01)
*G06F 16/2455* (2019.01)
*G06F 16/28* (2019.01)

(58) Field of Classification Search
USPC .................................................. 707/600–899
See application file for complete search history.

(56) References Cited

U.S. PATENT DOCUMENTS

| | | | |
|---|---|---|---|
| 2009/0300069 A1 | 12/2009 | O'Sullivan | |
| 2012/0215727 A1 | 8/2012 | Malik et al. | |
| 2013/0273937 A1* | 10/2013 | Nakahara | G06F 16/287 455/456.1 |
| 2016/0092496 A1 | 3/2016 | Dietterich et al. | |

OTHER PUBLICATIONS

Anonymous, "Unsupervised learning", https://en.wikipedia.org/wiki/Unsupervised_learning, Wikipedia, Aug. 4, 2017, 4 pages.

Anonymous, "Bag-of-words model", https://en.wikipedia.org/wiki/Bag-of-words_model, Wikipedia, Jun. 1, 2017, 4 pages.

Anonymous, "k-means clustering", https://en.wikipedia.org/wiki/K-means_clustering, Wikipedia, Aug. 10, 2017, 13 pages.

Anonymous, "Radial basis function", https://en.wikipedia.org/wiki/Radial_basis_function, Wikipedia, Jul. 16, 2017, 4 pages.

Anonymous, "Cosine similarity", https://en.wikipedia.org/wiki/Cosine_similarity, Wikipedia, Aug. 1, 2017, 6 pages.

Gagliardi, "Instance-based classifiers applied to medical databases: Diagnosis and knowledge extraction", ResearchGate, Artificial intelligence in medicine, May 2011, 61 pages.

Shahri, "Chaper III: A Machine Learning Approach to Data Cleaning in Databases and Data Warehouses", IGI Global, 2009, 16 pages.

Anonymous, "Heat Map, Automatic Data Optimization and ILM with Oracle Database", http://www.oracle.com/technetwork/topics/index-090321.html, ORACLE Database, accessed Aug. 15, 2017, 2 pages.

Anonymous, "Correlation and dependence", https://www.wikiwand.com/en/Correlation_and_dependence, Wikiwand, accessed Aug. 15, 2017, 12 pages.

List of IBM Patents or Patent Applications Treated as Related, dated Dec. 30, 2019, 1 page.

Specification "System and Method for Classification of Low Relevance Records in a Database Using Instance-Based Classifiers and Machine Learning" and Drawings in U.S. Appl. No. 16/695,634, filed Nov. 26, 2019, 36 pages.

\* cited by examiner

SYSTEM AND METHOD FOR CLASSIFICATION OF LOW RELEVANCE RECORDS IN A DATABASE USING INSTANCE-BASED CLASSIFIERS AND MACHINE LEARNING

BACKGROUND

The present invention generally relates to databases and, more particularly, to a system and method for classification of low relevance records in a database.

A software application that uses one or more databases generally has the capacity, and in many cases the need, to store records in one or more databases over various periods of time. However, numerous records in a database may become obsolete over time. These obsolete records may be disposable and/or have low relevance in database queries. As a database ages, the required storage size may increase due to the increasing number of stored records. These storage issues may be compounded by the presence of these obsolete records. More and more storage space may be required over time to accommodate this increasing amount of data.

SUMMARY

In a first aspect of the invention, there is a method that includes: in response to a request to delete a selected record in a database, generating a vector representation of the selected record, deleting the selected record in the database, and storing the vector representation of the deleted selected record, wherein a computer device performs the generating, the deleting, and the storing; in response to the storing the vector representation of the deleted selected record, the computer device determining a cluster from which the vector representation of the deleted selected record has a shortest determined distance, among a plurality of clusters into which a plurality of vector representations of deleted records is partitioned; determining, by the computer device, a distance between a record in the database and a nearest cluster among the plurality of clusters into which the plurality of vector representations of deleted records is partitioned; and in response to the record being within a predetermined distance of the nearest cluster, the computer device determining that the record is a deletion candidate record.

In another aspect of the invention, there is a computer program product that includes a computer readable storage medium having program instructions embodied therewith. The program instructions are executable by a computing device to cause the computing device to: receive a request to delete a selected record in a database; in response to the receiving the request to delete the selected record, generate a representation of the selected record, delete the selected record in the database, and store the representation of the deleted selected record; in response to the storing the representation of the deleted selected record, determine a cluster from which the representation of the deleted selected record has a shortest determined distance, among a plurality of clusters, and assign the representation of the deleted selected record to the determined cluster; determine a distance between a record in the database and a nearest cluster among the plurality of clusters; and in response to the record being within a predetermined distance of the nearest cluster, determine that the record is a deletion candidate record.

In another aspect of the invention, there is a system that includes: a hardware processor, a computer readable memory, and a computer readable storage medium associated with a computer device; program instructions of a database record deleter configured to, in response to a request to delete a selected record in a database, generate a vector representation of the selected record, delete the selected record in the database, and store the vector representation of the deleted selected record; program instructions of a cluster determiner configured to, in response to the database record deleter storing the vector representation of the deleted selected record, determine a cluster from which the vector representation of the deleted selected record has a shortest determined distance, among a plurality of clusters into which a plurality of vector representations of deleted records is partitioned; and program instructions of a deletion candidate determiner configured to determine a distance between a record in the database and a nearest cluster among the plurality of clusters into which the plurality of vector representations of deleted records is partitioned and, in response to the record being within a predetermined distance of the nearest cluster, determine that the record is a deletion candidate record, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
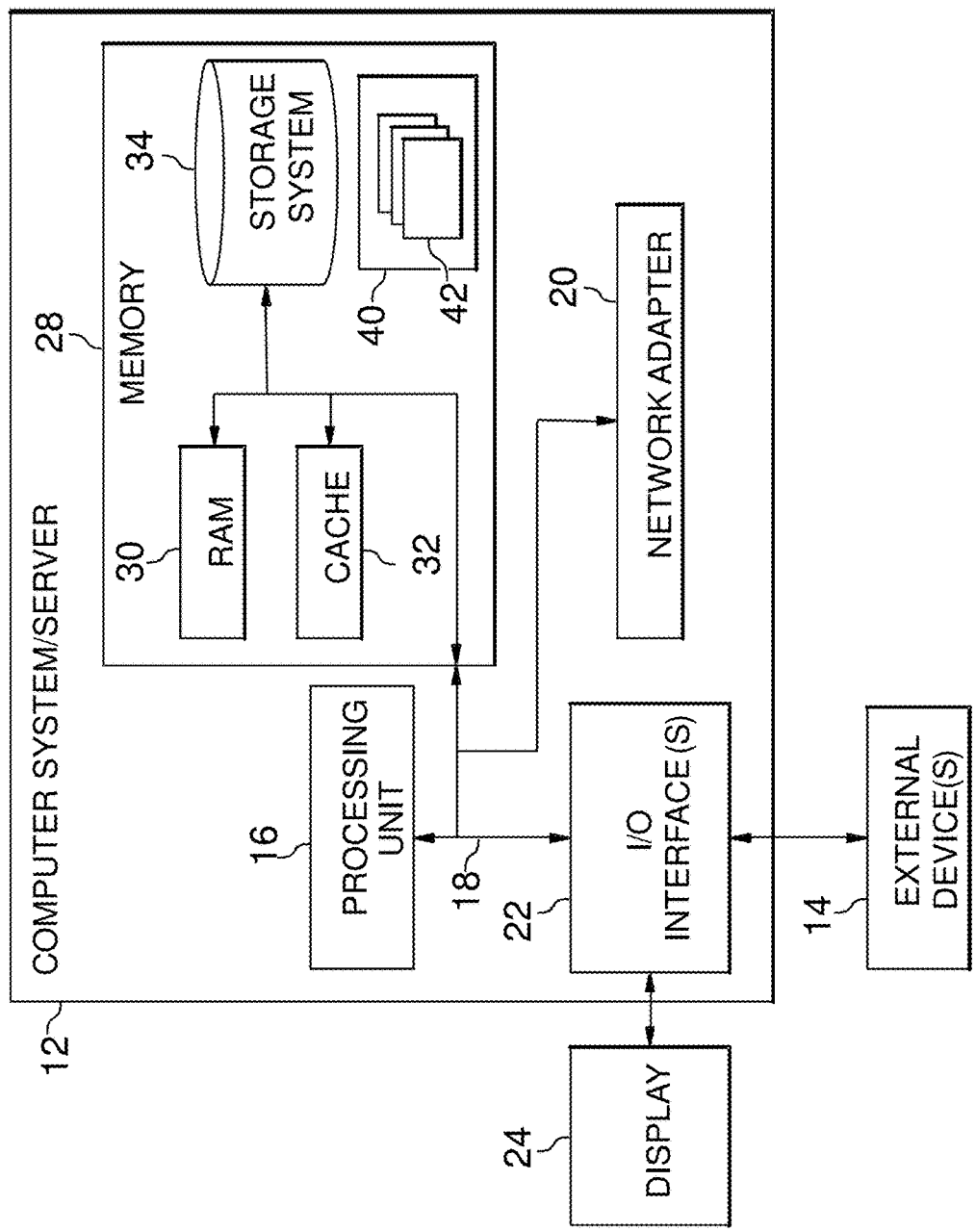
FIG. 1 depicts a computer system according to an embodiment of the present invention.

Selecting candidate records for deletion with accuracy in order to free up space may be difficult. Deletion candidates may be manually identified. Alternatively, scripting and other automatic methods may be used to identify deletion candidates, but these methods suffer from poor and potentially flawed rules that may identify, as deletion candidates, records that should not be discarded. If any of the erroneously identified deletion candidates are discarded, it may be necessary to recover the erroneously discarded data, resulting in a potentially challenging, time-consuming, and/or costly recovery process. In other cases, the erroneously discarded data may be unrecoverable and lost forever.

The present invention generally relates to databases and, more particularly, to a system and method for classification of low relevance records in a database. Aspects of the invention are directed to classifying records in a database as low relevance records, and identifying these low relevance records as candidates for deletion. Records that are no longer used, no longer relevant, or otherwise obsolete may be classified as low relevance records. Other aspects of the invention are directed to improving the accuracy of a process of classifying records in a database as low relevance records, and therefore minimizing the risk of erroneously identifying database records as deletion candidates and also minimizing the risk of the erroneous deletion of data.

Other aspects of the invention are directed to identifying database records as deletion candidates based on predefined rules that may be applied to databases storing data from any software that uses databases or any other data source. The predefined rules may consider criteria such as an insertion date, a last change date, an exclusion date, a queue order, relevance, context, and/or cosine distance. Other aspects of the invention are directed to using unsupervised machine learning principles, specifically the k-means clustering method, with a reference vector database that stores information about records previously deleted from a main database, in order to become increasingly assertive identifying records in the main database as deletion candidates as the reference vector database grows.

Instead of performing explicit generalization, aspects of the invention are directed to comparing database records with information about previously deleted database records (e.g., information stored in the reference vector database). As time goes by, more information is stored in the reference vector database, and an embodiment is able to become more assertive in identifying database records that are candidates for deletion based upon the additional information in the reference vector database. Aspects of the invention may improve the performance of the database as well as programs and applications connecting to the database by facilitating the reduction in size of the database after records identified as deletion candidates are deleted from the database. Other aspects of the invention may optimize storage and disk space utilization by facilitating the identification and deletion of low relevance records from the database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

According to an embodiment, computer system 12 may be a server, a desktop computer, a laptop computer, or any other computing device on which resides a main database and/or a reference vector database.

Figure 2:
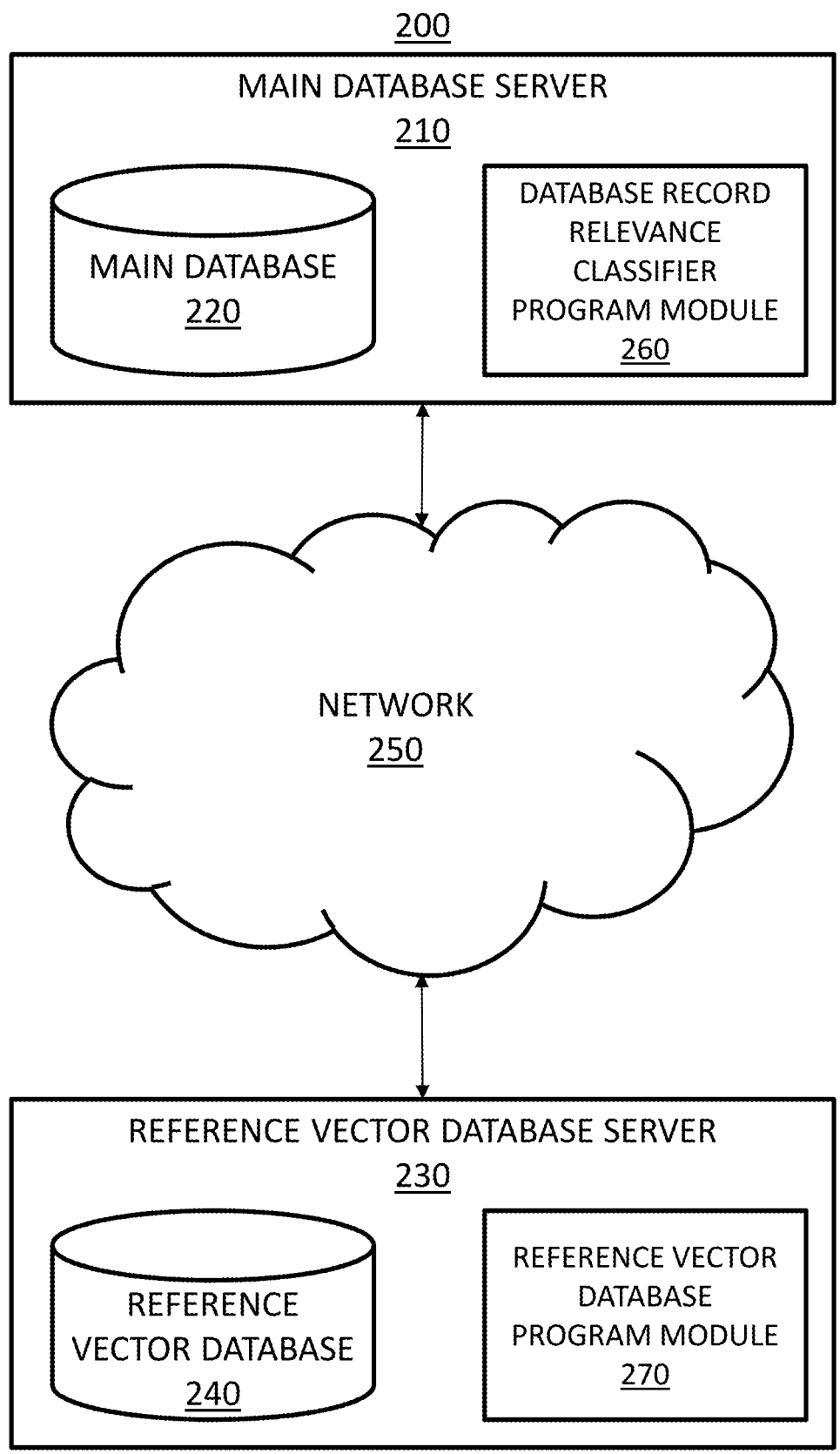
FIG. 2 depicts an illustrative environment according to an embodiment of the present invention.

FIG. 2 depicts an illustrative environment 200 according to an embodiment of the present invention. As shown, the environment 200 includes a main database server 210, which may be a computer system 12 as shown in FIG. 1. A main database 220 may reside on the main database server 210. Additionally, the main database server 210 may include a database record relevance classifier program module 260, which may be a program module 42 as shown in FIG. 1. The environment 200 may also include a reference vector database server 230, which may be a computer system 12 as shown in FIG. 1. A reference vector database 240 may reside on the reference vector database server 230. Additionally, the reference vector database server 230 may include a reference vector database program module 270, which may be a program module 42 as shown in FIG. 1. The main database server 210 and the reference vector database server 230 may be in communication via a network 250. The network 250 may be, for example, the Internet, a local area network, a wide area network and/or a wireless network.

The main database server 210 and the reference vector database server 230 may be separate computer systems, or may be implemented as a single computer system. The main database 220 and the reference vector database 240 may be any format or type of database (e.g., may use any database model), and may be interacted with using any database management system (DBMS).

Figure 3:
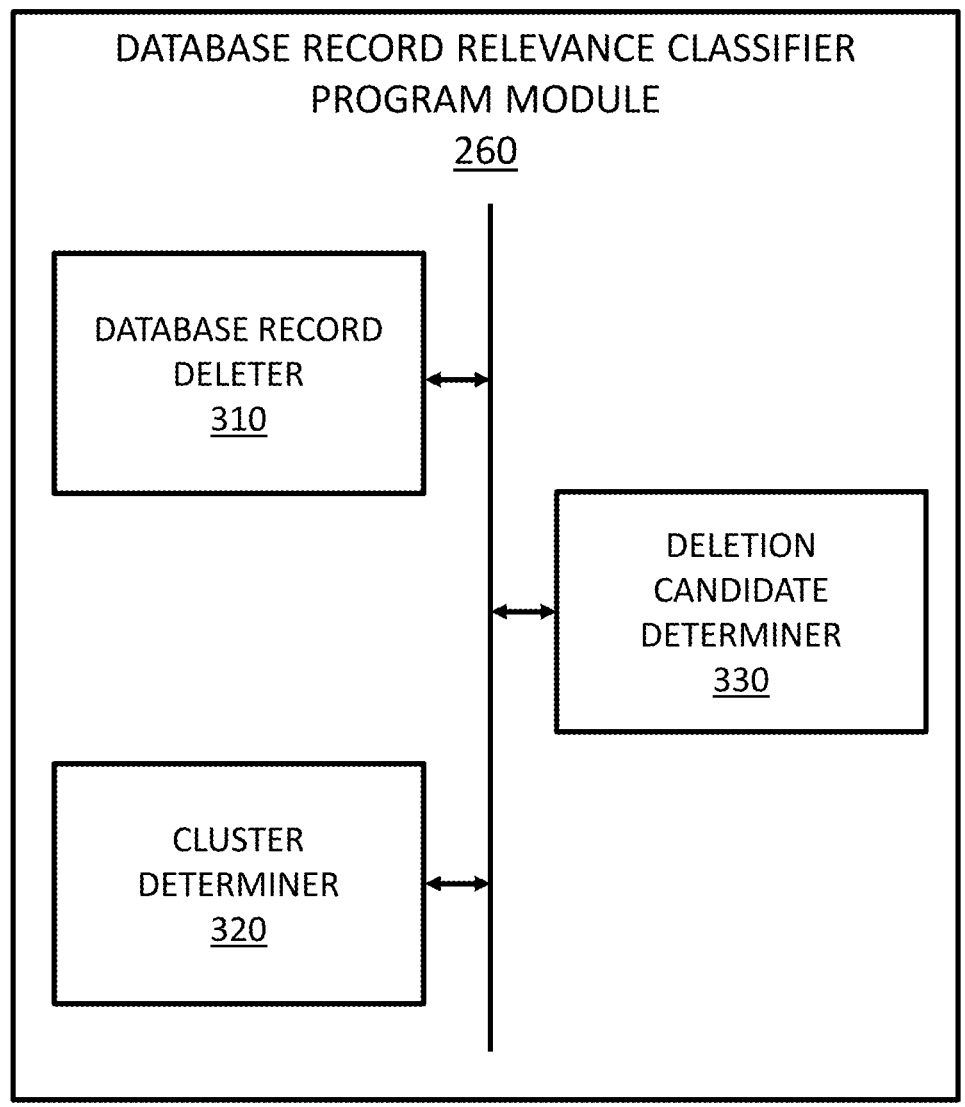
FIG. 3 shows a block diagram of an exemplary program module in accordance with aspects of the invention.

FIG. 3 shows a block diagram of an exemplary database record relevance classifier program module 260 in the main database server 210 in accordance with aspects of the invention. The main database server 210 may be a computer system 12 as shown in FIG. 1, and the database record relevance classifier program module 260 may be a program module 42 as shown in FIG. 1. According to aspects of the invention, the database record relevance classifier program module 260 may include a database record deleter 310, a cluster determiner 320, and a deletion candidate determiner 330.

The database record deleter 310 of the database record relevance classifier program module 260 in the main database server 210 according to an embodiment may be configured to, in response to a request to delete a selected record in the main database 220, generate a vector representation of the selected record, delete the selected record in the main database 220, and store the vector representation of the deleted selected record.

Specifically, the database record deleter 310 may receive a request to delete one or more records in the main database 220, from an application or service that stores data in the main database 220, retrieves data from the main database 220, or otherwise interacts with or manages the main database 220. Alternatively, the database record deleter 310 may receive a request to delete one or more records in the main database 220 from a database administrator or other user authorized to interact with the main database 220.

After receiving the request to delete one or more records in the main database 220, the database record deleter 310 may generate a representation of each of one or more records specified in the deletion request in a vector format. The database record deleter 310 may consider the record as a document in a text format and generate a reference vector using the bag-of-words technique which is known to those of ordinary skill in the art such that no further explanation is required for a complete understanding of the invention.

Additionally, after receiving the request to delete one or more records in the main database 220, the database record deleter 310 may delete the specified one or more records from the main database 220. Furthermore, after receiving the request to delete one or more records in the main database 220, the database record deleter 310 may store, in the reference vector database 240, the reference vector for each of the specified one or more records from the main database 220. The reference vector database 240 may be a dedicated database that holds a reference vector corresponding to each record deleted from the main database 220. These steps may be performed sequentially in any order, or substantially simultaneously, each time a request to delete a record is received by the database record deleter 310.

After the database record deleter 310 stores, in the reference vector database 240, the reference vector for each of the specified one or more records from the main database 220, the cluster determiner 320 of the database record relevance classifier program module 260 in the main database server 210 according to aspects of the invention may be configured to categorize the reference vector(s) newly stored in the reference vector database 240 using a modified k-means technique. A k-means technique is known to those of ordinary skill in the art such that only the following explanation of the modifications to the k-means technique is required for a complete understanding of the invention. The calculation of the distance among the reference vectors may be replaced by a radial basis function with values between 0 and 1, weighted based on a time between a last change of the record associated with the reference vector and the deletion of the record. The radial basis function is known to those of ordinary skill in the art such that no further explanation is required for a complete understanding of the invention. Instead of calculating the distance between the newly stored reference vector and all other reference vectors, only the distance between the newly stored reference vector and each existing cluster prototype (centroid) is calculated using the cosines distance function, which is given by:

$$\text{similarity} = \cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}}$$

where $A_i$ and $B_i$ are components of vector A and B respectively. Additionally, various criteria related to the deleted record associated with the reference vector, including criteria such as an insertion date, a last change date, an exclusion date, a queue order, relevance, and/or context, may be added as additional dimensions or weight factors on the above cosine similarity formula.

After calculating the distance between the newly stored reference vector each existing cluster prototype (centroid) using the cosines distance function, the cluster determiner 320 makes a determination regarding whether the newly stored reference vector belongs to an existing cluster, based upon the calculated distance and a predetermined threshold distance. If the newly stored reference vector is not within the predetermined threshold distance of an existing cluster, the newly stored reference vector is assigned to a new cluster with a newly created centroid. All of the other reference vectors may be reassessed by calculating the distance between each reference vector and the newly created centroid, and any reference vectors that are closer to the newly created centroid than to a centroid corresponding to their current cluster may be reassigned to the new cluster. According to other aspects of the invention, the cluster determiner 320 may periodically evaluate the reference vector database 240 and reassess centroids and assignments of reference vectors to clusters.

Alternatively, instead of being performed by the cluster determiner 320 of the database record relevance classifier program module 260 in the main database server 210, the above functions may be performed by the reference vector database program module 270 of the reference vector database server 230 according to other aspects of the invention.

The deletion candidate determiner 330 of the database record relevance classifier program module 260 in the main database server 210 may receive information about a selection of a record set from the main database 220. The record set may be selected on the basis of one or more of an insertion date, a last change data, an exclusion date, a queue order, relevance, context, and/or cosine distance. The deletion candidate determiner 330 may then identify deletion candidate records from the selected record set.

Each record in the selected record set may be considered a document in text format. Using the bag-of-words technique, the deletion candidate determiner 330 converts each record into a vector representation. The deletion candidate determiner 330 then compares the distance between the vector representation of each record in the selected record set from the main database 220 and each cluster prototype (centroid) in the reference vector database 240. The deletion candidate determiner may determine this distance between the vector representation of each record and each cluster prototype using the cosines distance function as discussed above with regard to the database record deleter 310. If, based upon the distance between the vector representation of a record and a nearest cluster prototype, the deletion candidate determiner 330 determines that the record belongs to the cluster corresponding to the nearest cluster prototype (e.g., the distance between the vector representation of the record and the nearest cluster prototype is within a predetermined threshold distance), the deletion candidate determiner 330 may determine that the record is a low relevance record and therefore a candidate for deletion. The deletion candidate determiner 330 may flag the record in the main database 220 as a deletion candidate.

Figure 4:
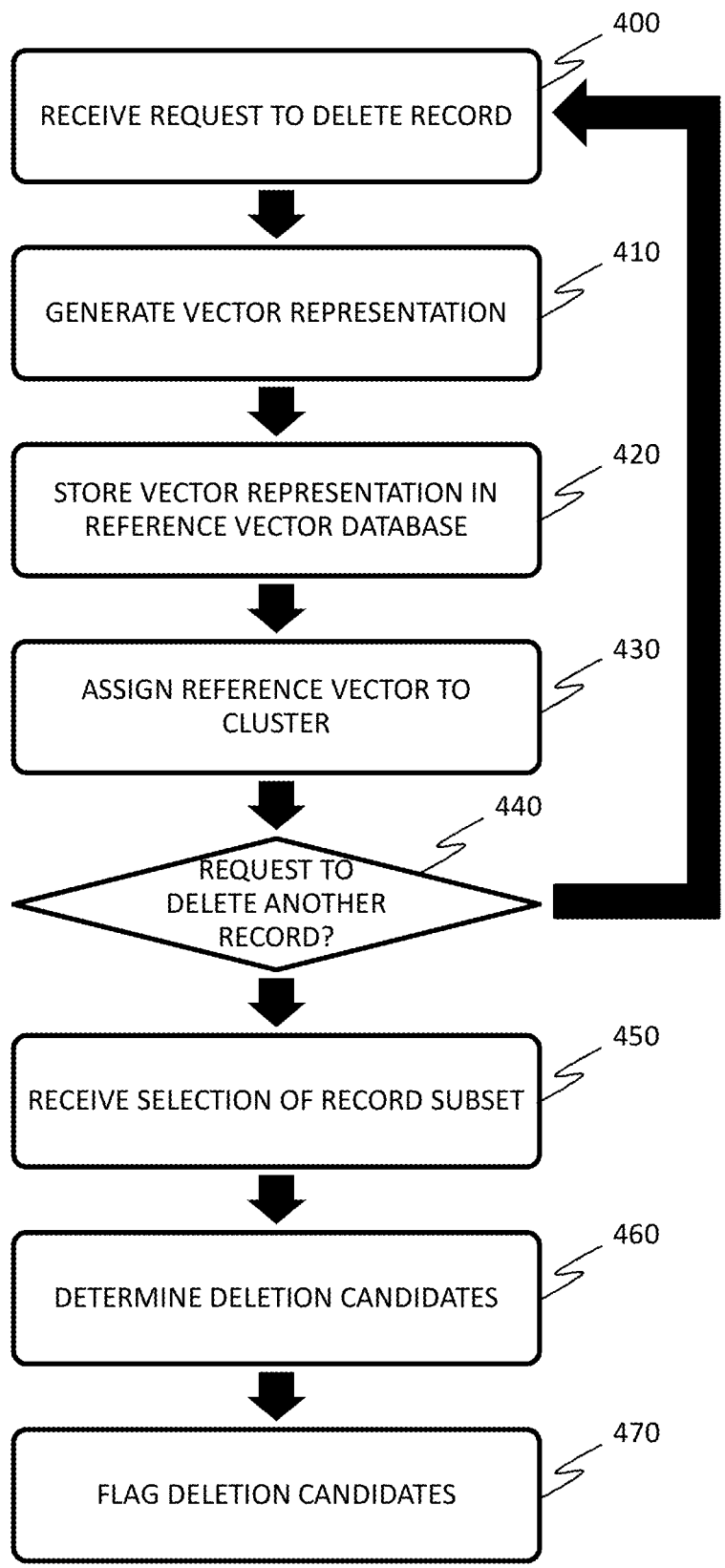
FIG. 4 depicts exemplary methods in accordance with aspects of the invention.

FIG. 4 depicts an exemplary method in accordance with aspects of the invention. The steps of the method may be performed in the computer system of FIG. 1, the environment of FIG. 2, and the program module of FIG. 3 and are described with reference to the elements and steps described with respect to FIGS. 1, 2, and 3.

At step 400, the system receives a request to delete one or more records from the main database 220. In embodiments, as described with respect to FIG. 3, step 400 may be performed by the database record deleter 310 of the database record relevance classifier program module 260 running on the main database server 210.

At step 410, the system generates a vector representation of each of the one or more records to be deleted from the main database 220. In embodiments, as described with respect to FIG. 3, step 410 may be performed by the database record deleter 310 of the database record relevance classifier program module 260 running on the main database server 210.

At step 420, the system stores, in the reference vector database 240, the vector representation of each of the one or more records to be deleted from the main database 220. In embodiments, as described with respect to FIG. 3, step 420 may be performed by the database record deleter 310 of the database record relevance classifier program module 260 running on the main database server 210.

At step 430, the system assigns each reference vector stored by the database record deleter 310 in the reference vector database 240 to a cluster. In embodiments, as described with respect to FIG. 3, step 430 may be performed by the cluster determiner 320 of the database record relevance classifier program module 260 running on the main database server 210.

At step 440, the system determines whether or not there is another request to delete one or more records in the main database 220. If it is determined in step 440 that there is another request to delete one or more records in the main database 220, the flow returns to step 400. On the other hand, if it is determined in step 440 there is not another request to delete one or more records in the main database 220, the flow proceeds to step 450. In embodiments, as described with respect to FIG. 3, step 440 may be performed by the database record deleter 310 of the database record relevance classifier program module 260 running on the main database server 210.

At step 450, the system receives a selection of a subset of records in the main database 230. In embodiments, as described with respect to FIG. 3, step 450 may be performed by the deletion candidate determiner 330 of the database record relevance classifier program module 260 running on the main database server 210.

At step 460, the system determiners deletion candidates from among the selected subset of records in the main database 230. In embodiments, as described with respect to FIG. 3, step 460 may be performed by the deletion candidate determiner 330 of the database record relevance classifier program module 260 running on the main database server 210.

At step 470, the system flags the records identified as deletion candidates from the selected subset of records. In embodiments, as described with respect to FIG. 3, step 470 may be performed by the deletion candidate determiner 330 of the database record relevance classifier program module 260 running on the main database server 210.

After the records identified as deletion candidates are flagged, a user such as a database administrator may review the flagged records and delete all or a portion of the flagged records. Alternatively, the system may automatically delete all of the flagged records or a portion of the flagged records selected based upon, for example, rules or filters specified in advance by a user such as a database administrator. Optionally, the system may delay the automatic deletion of flagged records for a predetermined period of time after the flagging of the records. During this delay period, a user such as a database administrator may unflag records, and the unflagged records may not be deleted in the automatic deletion performed after the predetermined period of time has elapsed. In embodiments, this step may be performed by the database record relevance classifier program module 260 running on the main database server 210.

Figure 5:
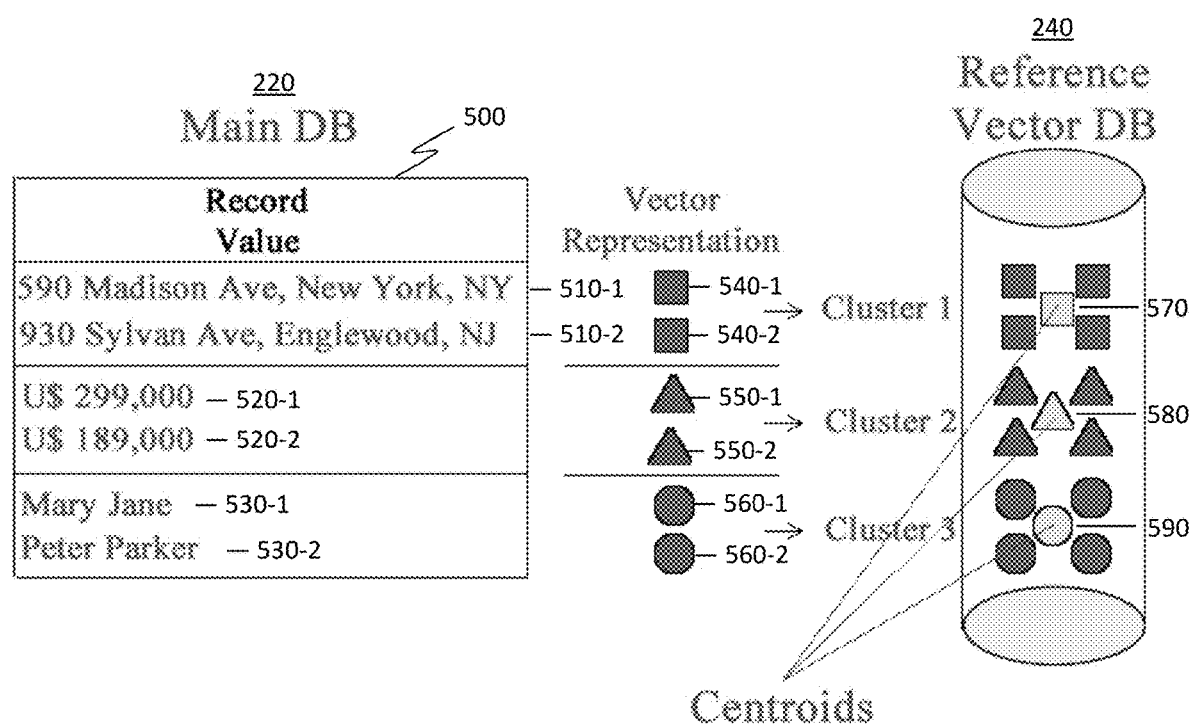
FIG. 5 depicts the insertion of vector representations of deleted records into a reference vector database in accordance with aspects of the invention.

FIG. 5 depicts insertion of vector representations of deleted records into a reference vector database in accordance with aspects of the invention. By way of a non-limiting example, a company may have three different business systems (e.g., customer relationship management, human resources, and sales). All three of these business systems may use a main database 220 as their main storage. The main database 220 may grow exponentially over time, but the database administrator may be unable to reduce the storage size of the main database 220 by removing unused data as the database administrator may not have sufficient knowledge regarding the customer relationship management, human resources, and sales systems to make decisions about what data may be removed. The main database 220 according to an example may have over 1,000,000,000 records. A subset of 10,000 records in the main database 220 may have been deleted by different users through different systems over time as part of their regular operations, including records 510-1, 510-2, 520-1, 520-2, 530-1, 530-2. Reference vectors corresponding to each of these 10,000 records (including reference vector 540-1 corresponding to record 510-1, reference vector 540-2 corresponding to record 510-2, reference vector 550-1 corresponding to record 520-1, reference vector 550-2 corresponding to record 520-2, reference vector 560-1 corresponding to record 530-1, and reference vector 560-2 corresponding to record 530-2) may have been generated and stored into a reference vector database 240 at the time of deletion. Each of the reference vectors 540-1, 540-2, 550-1, 550-2, 560-1, 560-2 is assigned to the cluster in the reference vector database 240 having the closest centroid 570, 580, 590.

Figure 6:
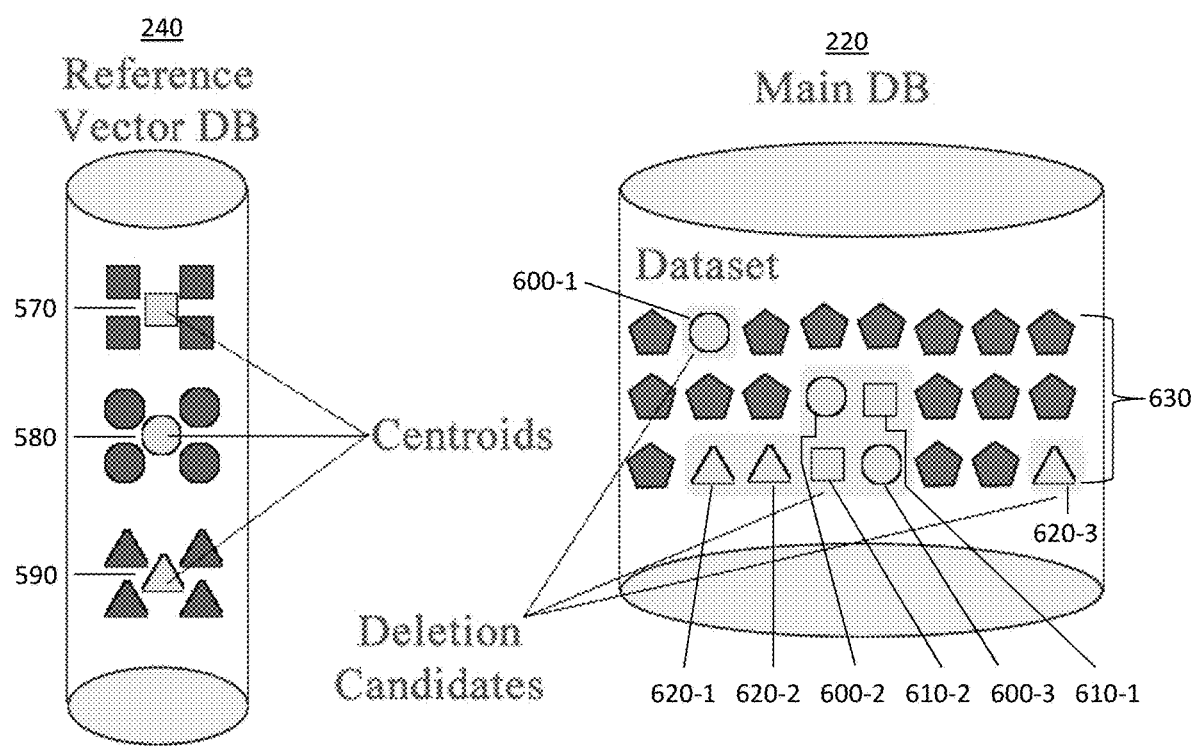
FIG. 6 depicts identification of deletion candidate records in accordance with aspects of the invention.

FIG. 6 depicts identification of deletion candidate records in accordance with aspects of the invention. Further according to this non-limiting example, the database administrator, seeking to delete unused or obsolete records from the main database 220 in order to reduce storage utilization and improve performance, may select a subset 630 of the records in the main database 220 consisting of all records that have been unmodified for more than two years. This subset 630 is analyzed by the deletion candidate determiner 330 to identify any low relevance records that may be flagged as deletion candidates, as discussed above. Specifically, records 600-1, 600-2, 600-3 are identified as deletion candidates based corresponding reference vectors upon being within a predetermined threshold distance of centroid 580 in the reference vector database 240. Records 610-1, 610-2 are identified as deletion candidates based corresponding reference vectors upon being within a predetermined threshold distance of centroid 570 in the reference vector database 240. Records 620-1, 620-2, 620-3 are identified as deletion candidates based corresponding reference vectors upon being within a predetermined threshold distance of centroid 590 in the reference vector database 240. The database administrator may then review and delete the records 600-1, 600-2, 600-3, 610-1, 610-2, 620-1, 620-2, 620-3 that are flagged as deletion candidates by the deletion candidate determiner 330.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for classification of low relevance records in a database, the method comprising:
in response to a request to delete a selected record in a database, generating a vector representation of the selected record, deleting the selected record in the database, and storing the vector representation of the deleted selected record, wherein a computer device performs the generating, the deleting, and the storing;
in response to the storing the vector representation of the deleted selected record, the computer device determining a cluster from which the vector representation of the deleted selected record has a shortest determined distance, among a plurality of clusters into which a plurality of vector representations of deleted records is partitioned;
determining, by the computer device, a distance between a record in the database and a nearest cluster among the plurality of clusters into which the plurality of vector representations of deleted records is partitioned; and
in response to the record being within a predetermined distance of the nearest cluster, the computer device determining that the record is a deletion candidate record,
wherein:
the vector representation of the deleted selected record is stored in a reference vector database that is separate from the database, and
the determining the distance between the record in the database and the nearest cluster comprises generating a bag-of-words vector representation of the record and determining the distance between the bag-of-words vector representation of the record and the nearest cluster among the plurality of clusters stored in the reference vector database.

2. The method according to claim 1, wherein the vector representation of the selected record is a bag-of-words representation.

3. The method according to claim 1, wherein the determining the cluster comprises using k-means clustering to determine the cluster from which the vector representation of the deleted selected record has the shortest determined distance.

4. The method according to claim 1, wherein the determining the distance between the bag-of-words vector representation of the record and the nearest cluster among the plurality of clusters comprises determining a distance between the bag-of-words vector representation of the record and a centroid of each of the plurality of clusters.

5. The method according to claim 1, wherein in response to determining that the record is a deletion candidate record, setting a flag identifying the record as the deletion candidate record.

6. A computer program product comprising a computer readable storage medium having program instructions embodied therewith, the program instructions executable by a computing device to cause the computing device to:
receive a request to delete a selected record in a database;
in response to the receiving the request to delete the selected record, generate a representation of the selected record, delete the selected record in the database, and store the representation of the deleted selected record;
in response to the storing the representation of the deleted selected record, determine a cluster from which the representation of the deleted selected record has a shortest determined distance, among a plurality of clusters, and assign the representation of the deleted selected record to the determined cluster;
determine a distance between a record in the database and a nearest cluster among the plurality of clusters; and
in response to the record being within a predetermined distance of the nearest cluster, determine that the record is a deletion candidate record,
wherein:
the representation of the deleted selected record is stored in a reference vector database that is separate from the database, and
the determining the distance between the record in the database and the nearest cluster comprises generating a bag-of-words vector representation of the record and determining the distance between the bag-of-words vector representation of the record and the nearest cluster among the plurality of clusters stored in the reference vector database.

7. The computer program product according to claim 6, wherein the representation of the selected record is a bag-of-words vector representation.

8. The computer program product according to claim 6, wherein the determining the cluster comprises using k-means clustering to determine the cluster from which the representation of the deleted selected record has the shortest determined distance.

9. The computer program product according to claim 6, wherein the determining the distance between the bag-of-words vector representation of the record and the nearest cluster among the plurality of clusters comprises determining a distance between the bag-of-words vector representation of the record and a centroid of each of the plurality of clusters.

10. The computer program product according to claim 6, the program instructions further causing the computing device to, in response to determining that the record is a deletion candidate record, set a flag identifying the record as the deletion candidate record.

11. A system, comprising:
a hardware processor, a computer readable memory, and a computer readable storage medium associated with a computer device;
program instructions of a database record deleter configured to, in response to a request to delete a selected record in a database, generate a vector representation of the selected record, delete the selected record in the database, and store the vector representation of the deleted selected record;
program instructions of a cluster determiner configured to, in response to the database record deleter storing the vector representation of the deleted selected record, determine a cluster from which the vector representation of the deleted selected record has a shortest determined distance, among a plurality of clusters into which a plurality of vector representations of deleted records is partitioned; and
program instructions of a deletion candidate determiner configured to determine a distance between a record in the database and a nearest cluster among the plurality of clusters into which the plurality of vector representations of deleted records is partitioned and, in response to the record being within a predetermined distance of the nearest cluster, determine that the record is a deletion candidate record,
wherein:
the program instructions are stored on the computer readable storage medium for execution by the hardware processor via the computer readable memory,
the database record deleter is further configured to store the vector representation of the deleted selected record in a reference vector database that is separate from the database, and
the cluster determiner is further configured to determine the distance between the record in the database and the nearest cluster by generating a bag-of-words vector representation of the record and determining the distance between the bag-of-words vector representation of the record and the nearest cluster among the plurality of clusters stored in the reference vector database.

12. The system according to claim 11, wherein the vector representation of the selected record is a bag-of-words representation.

13. The system according to claim 11, wherein the cluster determiner is further configured to use k-means clustering to determine the cluster from which the vector representation of the deleted selected record has the shortest determined distance.

14. The system according to claim 11, wherein the cluster determiner is further configured to determine the distance between the bag-of-words vector representation of the record and the nearest cluster among the plurality of clusters by determining a distance between the bag-of-words vector representation of the record and a centroid of each of the plurality of clusters.

* * * * *